Jan. 23, 1968  V. R. BART  3,365,615
SPEED RESPONSIVE CONTROL
Filed July 2, 1965
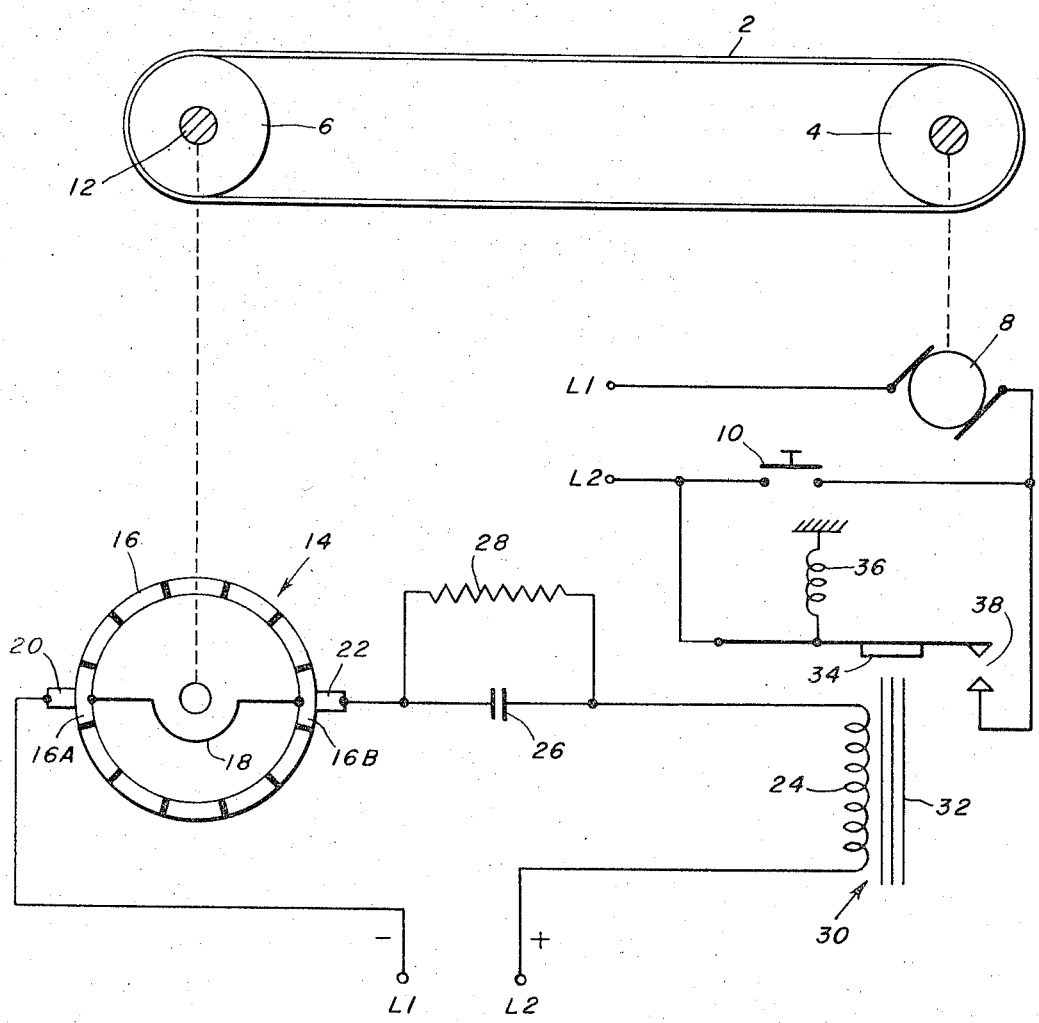
INVENTOR.
VICTOR R. BART
By Donald G. Dalton
Attorney

United States Patent Office 3,365,615
Patented Jan. 23, 1968

3,365,615
SPEED RESPONSIVE CONTROL
Victor R. Bart, 2527 Riverside Drive,
East Gary, Ind. 46405
Filed July 2, 1965, Ser. No. 469,267
2 Claims. (Cl. 317—5)

This invention relates to a speed responsive control and more particularly to a control for stopping motors on conveyor systems or the like when the speed of the conveyor departs from a preset minimum or maximum. It is often desirable to provide motion inter-locking for conveyor systems, stokers having draft fans, chain conveyors and the like. Conventionally this is accomplished by standard speed responsive switches such as centrifugal switches and plugging switches. The centrifugal switches are not effective at low rotational speeds and usually require expensive drive means to increase the rotational speeds of the switch. The atmosphere around many types of conveyors is polluted with dirt so that both centrifugal and plugging switches require constant and expensive maintenance.

It is therefore an object of my invention to provide a simple, inexpensive and efficient apparatus for electrically controlling the movement of a device so as to stop its operation whenever its speed departs from a preset minimum and maximum.

Another object is to provide such a control apparatus which can be directly coupled to the device being controlled.

Still another object is to provide such a control apparatus which will not be adversely affected by dirt or other atmospheric conditions.

These and other objects will be more apparent after referring to the following specification and attached drawing, in which:

The single figure is a schematic wiring diagram of my control as associated with a conveyor.

Referring more particularly to the drawing, reference numeral 2 indicates a conveyor belt supported on spaced apart rolls or pulleys 4 and 6. Pulley 4 is driven by a variable speed motor 8 from a D.C. power source L1, L2. A push button switch 10 in line L2 controls flow of current to motor 8. It will be understood that the motor 8 may have a control circuit with the switch 10 being located in the control circuit. Pulley 6 is mounted on a shaft 12 for rotation therewith. The parts so far described are conventional and form no part of the present invention.

According to my invention, shaft 12 is connected to drive a commutator 14 having a plurality of segments or conductors 16. Segments 16A and 16B are connected by a conductor 18 while all other segments are unconnected and insulated from one another. A brush 20 is connected to line L1 and a brush 22 is connected to line L2 through relay coil 24 and a capacitor 26. A resistor 28 is connected in parallel with capacitor 26. Coil 24 is part of a time delay relay 30 which also includes a core 32, armature 34, spring 36 and normally open contact 38 which is connected in parallel with switch 10. The time delay relay 30 may be any conventional type such as that shown in Allen Bradley Bulletin 849, Series 84920 H 338 Style 0. This type is used in one particular embodiment wherein the capacitor 26 has a value of 100 microfarads and the resistor 28 a value of 50,000 ohms.

In operation, the switch 10 is closed to start the motor 8. This starts the conveyor in operation with the shaft 12 rotating. When the brushes 20 and 22 first come in contact with segments 16A and 16B, current will flow from power source L1, L2 and the initial burst will charge capacitor 26 and energize coil 24, thus closing contact 38. Push button switch 10 is then released, but motor 8 will be energized through contact 38. When segments 16A and 16B rotate out of contact with brushes 20 and 22, the capacitor 26 slowly discharges through resistor 28. This slow discharge continues until segments 16A and 16B contact brushes 22 and 20, respectively. Again, in a single burst, capacitor 26 will be charged and coil 24 energized. Time delay relay coil 24 is so selected that it will hold contact 38 closed while the shaft 12 rotates through 180° and resistor 28 is so selected that it will not pass sufficient current to energize coil 24 in the event that segments 16A and 16B should stop while contacting brushes 20 and 22. If the shaft 12 should stop rotating or rotates at such a low velocity that the time delay period of relay coil 24 is exceeded, contact 38 will open. On the other hand, if shaft 12 rotates at such a high speed that capacitor 26 will not discharge a sufficient amount of current during the time shaft 12 rotates through 180° to enable sufficient current to pass to coil 24 to overcome the force of spring 36, contact 38 will open after the time delay period of relay coil 24 is exceeded. When contact 38 opens for any reason, motor 8 is deenergized and the conveyor will stop. It is then necessary to depress switch 10 to again start the conveyor moving.

While one embodiment of my invention has been shown and described it will be apparent that other adaptations and modifications may be made without departing from the scope of the following claims.

I claim:

1. Apparatus for stopping a moving member when its speed departs from a preset minimum and maximum which comprises a power source, a time delay relay coil, a capacitor and two spaced apart brushes connected in series circuit to said power source, a resistor connected in parallel with said capacitor, a rotating conductor extending between said brushes and adapted to complete said series circuit during rotation thereof, means for rotating said rotating conductor at a speed proportional to the speed of said moving member, and a contact operable by said relay coil to keep said moving member moving as long as its speed is between the preset maximum and minimum and to stop movement of said member when its speed departs from said preset maximum and minimum.

2. Apparatus for stopping a moving member when its speed departs from a preset minimum and maximum which comprises a power source, a time delay relay coil, a capacitor and two spaced apart brushes connected in series circuit to said power source, a resistor connected in parallel with said capacitor, a rotating conductor extending between said brushes and adapted to complete said series circuit during rotation thereof, means for rotating said rotating conductor at a speed proportional to the speed of said moving member, a normally open contact operable by said relay coil, said relay coil being operable to close said normally open contact when said moving member is moving between its maximum and minimum speeds, and means operable by opening of said normally open contact to stop said moving member when its speed departs from said preset maximum and minimum.

References Cited

UNITED STATES PATENTS

| | | | |
|---|---|---|---|
| 2,472,526 | 6/1949 | Frazee | 340—271 |
| 2,567,928 | 9/1951 | Farmer | 317—5 X |
| 3,048,748 | 8/1962 | Carey | 317—157 |
| 3,153,176 | 10/1964 | Clay | 317—157 |
| 3,174,080 | 3/1965 | Scott | 317—141 X |
| 3,201,658 | 8/1965 | Reynolds | 317—141 X |

LEE T. HIX, *Primary Examiner.*